H. E. EDWARDS.
CLIP FOR SPRING STRUCTURES.
APPLICATION FILED APR. 22, 1919.

1,355,133. Patented Oct. 12, 1920.

Witness
P. F. Gathmann

Inventor
Henry E. Edwards
By
Attorney

UNITED STATES PATENT OFFICE.

HENRY E. EDWARDS, OF JACKSON, MICHIGAN, ASSIGNOR TO JACKSON CUSHION SPRING COMPANY, OF JACKSON, MICHIGAN.

CLIP FOR SPRING STRUCTURES.

1,355,133.     Specification of Letters Patent.     Patented Oct. 12, 1920.

Application filed April 22, 1919. Serial No. 291,821.

*To all whom it may concern:*

Be it known that I, HENRY E. EDWARDS, a citizen of the United States, residing at Jackson, in the county of Jackson and State of Michigan, have invented certain new and useful Improvements in Clips for Spring Structures, of which the following is a specification.

This invention relates to spring structures, and particularly to clips for connecting adjacent springs together.

Spring structures for automobiles, car seats, beds and analogous manufactures include a plurality of springs in which the individual springs are subject to pressure and strain in different directions at various times incident to different reasons. For these reasons it has been found expedient to tie adjacent springs together either at points intermediate the upper and lower ends of the springs or to provide a tie between the upper ends of the springs. Commercially, it is more expeditious and economical to connect the springs together after the structure has been assembled rather than to apply the tie or link connections between the springs prior to assembling the structure. This latter method is unsatisfactory, inconvenient, and an expensive practice. Certain types of clips cannot be connected to the springs after the structure has been assembled.

It is therefore an object of the present invention to provide an exceedingly simple, durable, economical and efficient link designed to connect together the springs of spring structures and which may be easily and readily applied to the tops of the springs or intermediate the ends thereof after the spring structure has been assembled and is ready for the application of the upholstering material thereto.

With these and other objects in view, the invention consists in the construction and novel combination of parts hereinafter more fully described, illustrated in the accompanying drawings and pointed out in the claim hereto appended, it being understood that various changes in the form, proportion, size and minor details of construction, within the scope of the appended claim, may be resorted to without departing from the spirit or sacrificing any of the advantages of the invention.

In the drawings:—

Figure 1:
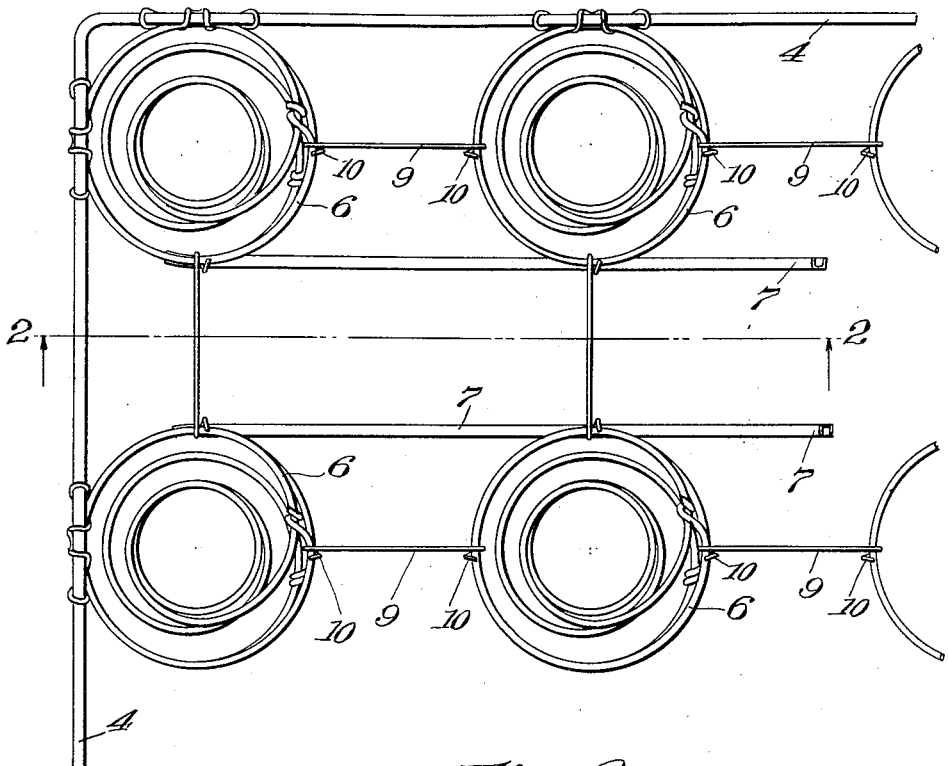
Figure 1 is a top plan view of the invention.
Figure 2:
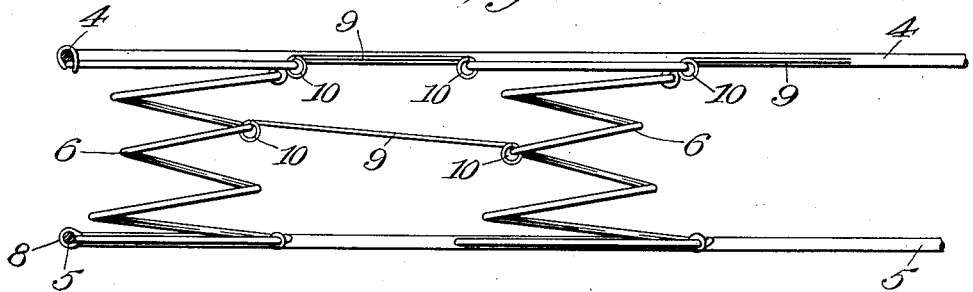
Fig. 2 is a cross sectional view on the line 2—2 of Fig. 1.
Figure 3:
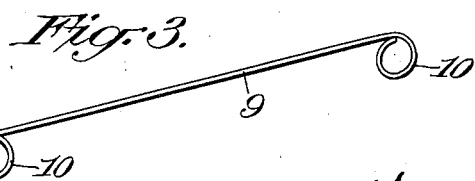
Fig. 3 is a detailed perspective view of one of the clips for connecting the springs together.

Referring now more particularly to the accompanying drawings, the reference characters 4 and 5 indicate upper and lower wire or other frames, respectively, and 6 indicates springs arranged between the frames, and these springs may be mounted in any suitable manner. In the present instance, the bases of the springs are secured in channel-shaped supporting bars 7. These supporting bars are shown as terminating short of the sides or ends of the base frame and they are supported or connected to the base frame 5 by virtue of the convolutions of the end springs of a row being connected to the base frame through the instrumentality of suitable clips 8. The upper convolutions of adjacent springs may be connected together by means of the present form of clip or the clips may connect intermediate convolutions of adjacent springs. All of the clips are formed substantially alike and each consists of a body portion 9 having hooks formed in the shape of eyes or single coils 10. The coils at the ends of the body portion 9 are directed from the same side of the body 9 and are formed so as to obviate the necessity of threading the ends of the clips into engagement with the convolutions of the springs. The hooked ends of the clips are adapted to be sprung into engagement with the convolutions of the springs. The clips may be of any suitable length, the clips being shorter when they connect the upper convolutions of the springs than when they connect intermediate convolutions of hour-glass springs, as shown particularly in Fig. 2.

To apply one of the present clips, it may be done in various ways, but one method is to engage one end of the clip with one convolution of a spring and pull upon the clip to cause the hook eye 10 to snap or spring over the convolution of the spring. In other words, the corresponding convolution of the spring passes between the coiled portion of the clip to the body portion thereof. When the convolution has been sprung between the coiled portion of the clip and the body portion thereof, the clip is adapted to turn to present the hooked end from a substantially horizontal position to a vertical position with the convolution of the spring passing through the corresponding hooked eye of the clip. The opposite end of the clip may be connected to an adjacent spring in any way and when two adjacent springs have been connected the body portion assumes a substantially horizontal plane, while the eyes 10 assume a vertical plane with the respective convolutions fitting in the eyes 10 of the various clips. The clips may be readily sprung out of connection with the springs and just as readily may this be done as may be the application of the clips to the springs. The result is that the clips do not have to be threaded into engagement with the springs and the spring structure may be completed for upholstering purposes before the clips are applied.

What is claimed is:—

As a new article of manufacture a clip for connecting adjacent springs together comprising a relatively straight body portion provided at each end with a single coil, said single coils being disposed out of the plane of the body portion and at an acute angle to the same and having their terminals arranged opposite the ends of the straight body portion in spaced relation with the said ends, both coils being adapted to be sprung into connection with the springs and the coils being arranged to drop by gravity below the straight body portion.

In testimony whereof I affix my signature.

HENRY E. EDWARDS.